Patented July 14, 1942

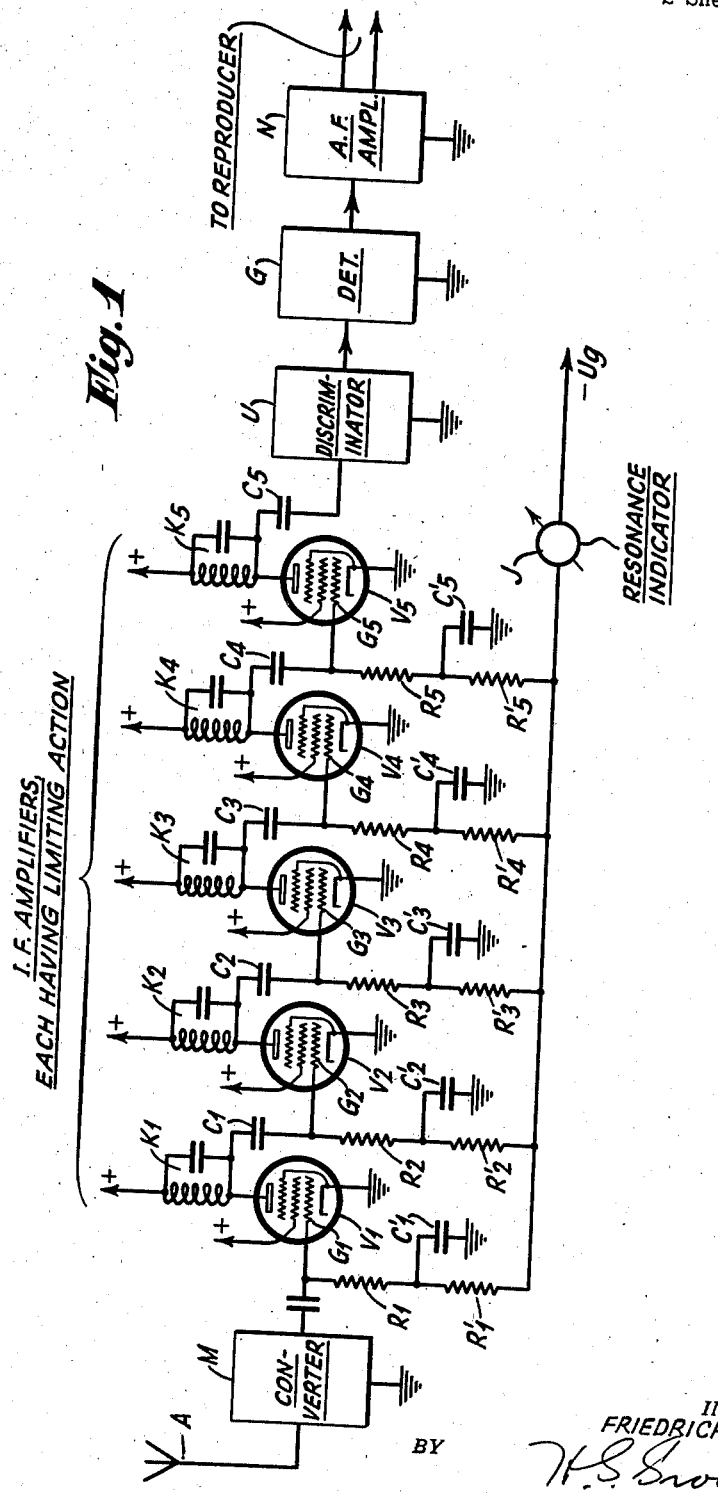

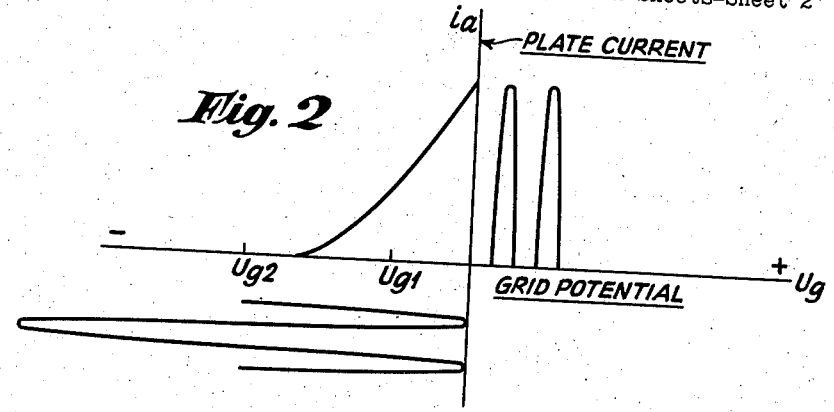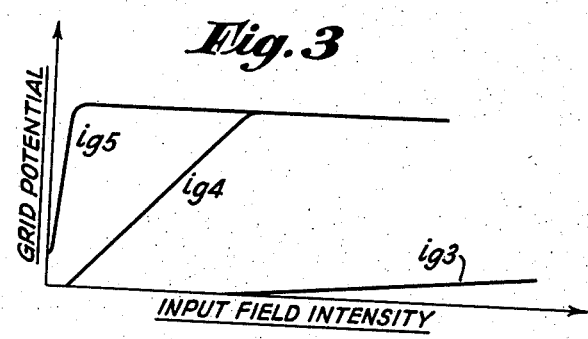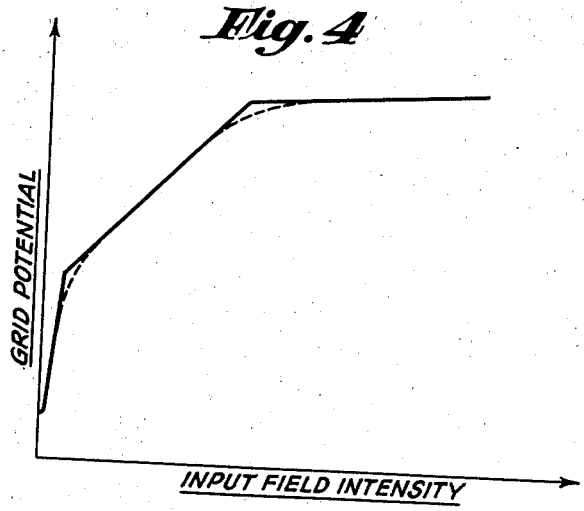

2,289,840

UNITED STATES PATENT OFFICE 2,289,840

FREQUENCY MODULATION RECEIVER

Friedrich Herz, Berlin-Kopenick, Germany, assignor to Telefunken Gesellschaft für Drahtlose Telegraphie m. b. H., Berlin, Germany, a corporation of Germany Application June 26, 1940, Serial No. 342,415
In Germany March 1, 1939

5 Claims. (Cl. 250—20)

Means have been provided in the past in receivers designed for the reception of frequency, or phase, modulated oscillations for the purpose of limiting the amplitude thereof with a view to eliminating undesired amplitude modulation. Such limitation, moreover, has the advantage that means for automatic volume control may be wholly, or at least partly, dispensed with, and that it cuts down disturbing noises. After such limitation has been imposed, the oscillations are fed to the frequency, or the phase, demodulator.

It is desirable in the manipulation and operation of the receiver set, in exact and sharp tuning to any given transmitter station, in the determination of the optimal direction of the antenna in comparing different transmitters, and in the observation of the receiving conditions at different places or at, different times, to have available means adapted to indicate the input amplitude of any particular transmitter that is coming in.

This want is satisfied, according to this invention, by using for an indication or measurement of the different input amplitudes the current in the limiter means in circuits comprising means for limiting the incoming, or signal, oscillation consisting of limiters taking current, or more particularly an amplifier tube taking grid current in the presence of relatively large signal amplitudes.

More particularly, the grid return lead of one or more amplifier tubes, whose input circuit is connected in the manner of an audion or grid rectifier or biased detector tube working with a blocking condenser and grid leak, is connected with the cathode or preferably with a point which is at a negative potential in respect to the cathode, by way of a common measuring instrument.

Arrangements, moreover, are made in such a way that the limiter action, and thus the grid current flow, occurs consecutively in the various amplifier stages so that the deflection of the instrument rises roughly in accordance with a logarithmic law as the input amplitude increases.

In the drawings:

Fig. 1 shows a circuit embodying the invention,
Fig. 2 graphically shows limiter operation,
Fig. 3 shows the cascaded limiter action,
Fig. 4 illustrates the overall action of the cascaded limiters.

An exemplified embodiment of the invention is shown in Fig. 1 which is a diagram of an ultra-short wave heterodyne receiver designed for receiving frequency modulated oscillations. Such waves will be noted as "FM." The receiving antenna A feeds the signal oscillation collected by it (which may have a wave length of a few decimeters up to several meters) to the tunable oscillator-mixer stage M. That is, the stage M is the usual converter. The resulting IF (intermediate frequency) oscillations of a frequency of 2 megacycles (mc) are amplified by the five IF amplifying stages $V_1$, $V_2$, $V_3$, $V_4$, and $V_5$ and are simultaneously limited. The limited energy is then fed to the stage U designed to change the frequency modulated oscillations into amplitude modulated oscillations. Stage U is the discriminator. The output of the latter is thereupon rectified in the detector stage G, and after amplification in the AF amplifier N it is fed to the reproducer.

The anodes, or plates, of the IF amplifier tubes $V_1$—$V_5$ are connected by way of tuned IF circuits $K_1$—$K_5$, respectively, with the positive poles of the operating direct current voltage source of supply, and through blocking condensers $C_1$—$C_5$ of low capacity with the input of the stage next following. The control grids $G_1$—$G_5$ of tubes $V_1$—$V_5$ (all pentodes) are each connected by way of a series path each comprising two resistances $R_1$—$R_1'$ ($R_2$—$R_2'$; $R_3$—$R_3'$; $R_4$—$R_4'$; $R_5$—$R_5'$) and a common measuring instrument J with a point having a negative potential in respect to the grounded cathode or filament. The junction points of the resistances are grounded capacitatively by means of condensers $C'_1$, $C'_2$, $C'_3$, $C'_4$, and $C'_5$, respectively.

The constant negative grid biasing voltage $-U_g$ is so chosen that the operating point fixed thereby comes to lie in the middle of the drive range of the tubes $V_1$—$V_5$. The time constants of the RC meshes associated with the grids are so chosen that beginning with a certain signal amplitude, to be more precise when the region is reached where current begins to flow, an auxiliary negative biasing potential arises which causes the operating point to be pushed farther into the negative region. The plate current amplitude is thereafter stabilized (that is as the grid biasing voltage amplitude increases still further) at the value determined by the drive range or grid base.

This can be clearly followed from Fig. 2 where the plate current $ia$ of an amplifier tube is plotted as a function of the grid potential $U_g$. $U_{g1}$ represents the operating point established by the fixed biasing voltage, while $U_{g2}$ is the operating point which is spontaneously established in the presence of grid voltage amplitudes indicated below the abscissa. The plate current has the shape of radio frequency impulses between which (that is, for the negative alternation of the grid voltage) no plate current is flowing. The oscillation circuit included in the plate circuit of the tube filters out again the sine-shaped fundamental wave which substantially is free from amplitude modulation.

The gain of the amplifier is preferably chosen so high that the last tube is driven the full limit by thermal noises of the receiver input (circuit and tube noise). In other words, the last tube is spontaneously biased at a grid voltage which is located to the left of the negative bend of the plate voltage characteristic (see Fig. 2). This offers the advantage that the noise is greatly curtailed. In order that this effect may be completed attained it is, to be sure, necessary that the time constant of the RC meshes associated with the grid, as is true of the standard grid-current three-electrode detector, should not only be lower than the period of the highest modulation frequencies, but even be lower than the period of the highest noise frequencies still passed by the IF channel. Another advantage of choosing the constants as stated is that reproduction is initiated suddenly with full force as the signal amplitude increases from zero.

The deflection of the instrument J is a measure and criterion for the incoming signal field intensity so that it will be suited for sharp tuning, for choosing the direction of the antenna, etc. As soon as flow of grid current has been initiated in a tube this current will roughly rise according to a linear law as the signal amplitude increases. The limiter action starts in tube $V_5$, then in tube $V_4$ and so on in sequence. The various grid currents $i_{g5}$, $i_{g4}$, $i_{g3}$, etc., as a function of the input field intensity have a shape as shown in Fig. 3. Each of the grid currents assumes a constant final or limiting value as soon as the limiter action starts in the preceding tube.

The aggregate current I being the sum total of the various grid currents will then have a shape such as shown in Fig. 4. At the bends the slope of the curve always diminishes at a ratio corresponding to the amplification of each stage, since the total amplification starting at the input end as far as the first effective limiter stage is decreased in each instance by the gain of one stage, the remaining stages then furnishing a grid D. C. which stays constant. In reality, however, the bends are rounded more markedly as indicated by the dash line portions in the graph. What results is a roughly logarithmic reading curve which is particularly suited so as to encompass a large range. In other words, a large range can be accommodated in one scale; at the same time, the percentage reading error is the same no matter what the field intensity.

The lower portions of the RC meshes associated with the grids namely, filters $R'_1$—$C'_1$, serve to insure the audion effect, and they are also adapted to insure radio frequency decoupling of the various grid returns. The coupling of the grid returns by the measuring instrument J may be minimized by choosing suitable constants (low-ohm instrument). Indeed, occasionally it insures even a desired additional automatically acting amplifying regulation, for it will be noted that even for the limiter action produced by the last tube the grid biasing voltages of the preceding tubes are rendered more markedly negative. Instead of a standard instrument it would, of course, also be possible to employ some other indicator device such as an electron-ray tube. In the case of indicator instruments which as is true of this case utilize a voltage rather than a current for control action it is recommendable to use a special D. C. amplifier.

What is claimed is:

1. In a frequency modulation receiver of the superheterodyne type, a plurality of intermediate frequency amplifier stages, each stage including a separate resistor-capacitor means rendering it operative as an amplitude modulation limiter, and said resistor-capacitor means in each of said stages being constructed and arranged to render the limiting action in said stages sequential in the direction of decreasing signal intensity and a resonance indicator means in electrical circuit with each resistor-capacitor means and adapted to be responsive to current flow through the resistors thereof.

2. In a receiver of frequency modulated waves, a plurality of amplifier tubes, each tube including at least a cathode, an input grid and an output electrode, said tubes being arranged in cascade and each being tuned to the center frequency of received waves, a resonant output circuit connected to the output electrode of each amplifier tube tuned to said center frequency, a resistor-condenser network operatively associated with the control grid and cathode of each tube for rendering each tube operative as a limiter of amplitude variation of said modulated waves and the time constant of each resistor-condenser network being chosen lower than the period of the highest modulation frequencies and lower than the period of the highest noise frequencies passed by said amplifier tubes.

3. In a receiver of frequency modulated waves, a plurality of amplifier tubes, each tube including at least a cathode, an input grid and an output electrode, said tubes being arranged in cascade and each being tuned to the center frequency of received waves, a resonant output circuit connected to the output electrode of each amplifier tube tuned to said center frequency, and a resistor-condenser network operatively associated with the control grid and cathode of each tube for rendering each tube operative as a limiter of amplitude variation of said modulated waves, and said resistor-condenser networks being so relatively proportioned that limiting action of said tubes is sequential in the direction of decreasing signal intensity.

4. In a receiver as defined in claim 2, each of said tube cathodes being established at a relatively fixed alternating potential as well as a fixed direct current potential, means operatively associated with the resistor of each of said networks and the cathode of each respective amplifier tube for establishing the control grid of each tube at a common normal negative potential.

5. In a receiver as defined in claim 3, means for establishing the control grid of each tube at a negative potential relative to its cathode, and an indicator electrically connected with the control grids of all the tubes and responsive to grid current flow in each tube during limiting action thereof.

FRIEDRICH HERZ.